(12) United States Patent
Kim et al.

(10) Patent No.: US 12,278,753 B2
(45) Date of Patent: Apr. 15, 2025

(54) APPARATUS, SYSTEM AND METHOD FOR MANAGING SERVICE MESH TRAFFIC IN A DISTRIBUTED KUBERNETES MULTI-CLUSTER ENVIRONMENT

(71) Applicant: FOUNDATION OF SOONGSIL UNIVERSITY-INDUSTRY COOPERATION, Seoul (KR)

(72) Inventors: Young Han Kim, Seoul (KR); Eui Jin Cho, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 41 days.

(21) Appl. No.: 18/515,617

(22) Filed: Nov. 21, 2023

(65) Prior Publication Data
US 2024/0205132 A1    Jun. 20, 2024

(30) Foreign Application Priority Data

Dec. 19, 2022  (KR) .......................... 10-2022-0178010
Mar. 8, 2023   (KR) .......................... 10-2023-0030505

(51) Int. Cl.
*G06F 15/173*   (2006.01)
*H04L 45/00*    (2022.01)
*H04L 45/02*    (2022.01)
*H04L 45/302*   (2022.01)

(52) U.S. Cl.
CPC ............ *H04L 45/02* (2013.01); *H04L 45/302* (2013.01); *H04L 45/46* (2013.01)

(58) Field of Classification Search
CPC ........ H04L 45/02; H04L 45/302; H04L 45/46
USPC ......................................................... 709/238
See application file for complete search history.

(56) References Cited

U.S. PATENT DOCUMENTS

2022/0046084 A1\* 2/2022 Nair ................... H04N 21/4334
2022/0109741 A1\* 4/2022 Chen ....................... H04L 69/40

\* cited by examiner

*Primary Examiner* — Alan S Chou
(74) *Attorney, Agent, or Firm* — Stein IP, LLC

(57) ABSTRACT

A service mesh traffic management apparatus, system, and method in a distributed Kubernetes multi-cluster environment are disclosed. A service mesh traffic management apparatus in a distributed Kubernetes multi-cluster environment comprises a processor, and a memory connected to the processor, wherein the memory stores program instructions executable by the processor for performing operations comprising receiving a monitoring metric collected by a Prometheus server distributed in the multi-cluster, selecting a first routing policy based on a predefined routing policy selection rule and the collected monitoring metric, comparing the first routing policy and a second routing policy currently in use, distributing, when the first routing policy and the second routing policy are different, the first routing policy to each proxy in the service mesh.

15 Claims, 3 Drawing Sheets

FIG. 3

```
apiVersion: control.dcn.ssu.ac.kr/v1
kind: TrafficManage
metadata:
  name: trafficmanage-sample
spec:
  host: serviceName
  metric: container_cpu_user_seconds_total
  formula: rate(container_cpu_user_seconds_total[30s]) * 100
  updatePeriodMinutes: 30
  policies:
  - vsName: vs1
    percent: 10
  - vsName: vs2
    percent: 20
  - vsName: vs3
    percent: 30
```

APPARATUS, SYSTEM AND METHOD FOR MANAGING SERVICE MESH TRAFFIC IN A DISTRIBUTED KUBERNETES MULTI-CLUSTER ENVIRONMENT

CROSS-REFERENCE TO RELATED APPLICATIONS

This application claims the benefit of Korean Application Nos. 10-2022-0178010 filed Dec. 19, 2022, and 10-2023-0030505 filed Mar. 8, 2023, in the Korean Intellectual Property Office. All disclosures of the documents named above are incorporated herein by reference.

TECHNICAL FIELD

The present invention relates to a service mesh traffic management apparatus, system, and method in a distributed Kubernetes multi-cluster environment.

BACKGROUND ART

Kubernetes is an open-source platform for managing containerized services and workloads, and is being actively used by many companies as they transition their systems to a cloud environment.

Kubernetes operates on a cluster basis, which is a set of worker nodes that host container-type applications and master nodes that manage the worker nodes. By operating multiple clusters together, the multi-cluster infrastructure has the advantages of improving application availability and reducing user waiting time.

Microservice Architecture (MSA) is a software development technique that develops one large service by dividing it into small services for each function. Because it develops small services for each function, it is a structure suitable for a cloud environment that has strengths in terms of development and management. However, the problem of dividing services for each function is that as the overall service grows, the number of services increases exponentially and the network between multiple services becomes complicated.

The service mesh architecture, a structure that complements this, attempted to solve the problem of network complexity by using proxies for communication between services.

Service mesh provides several functions for managing multiple microservices, but the traffic management mechanism is designed with a focus on reliability.

This is a suitable method for general IT applications, but recent applications have various performance requirements in addition to reliability, and typical examples include applications that require bandwidth or are sensitive to delay.

Additionally, the service mesh fundamentally lacks the functionality to support multi-site infrastructure. In order to support multi-site infrastructure, several factors including not only the operation of the service but also the network situation should be considered, but there is a problem that the service mesh itself does not support it.

As mentioned above, the service mesh manages traffic in and out of services through proxies connected to each microservice. For this purpose, the service mesh has a resource that manages routing rules through each proxy, and the proxy determines to which service the traffic is forwarded through the resource. However, there is a problem that monitoring information cannot be reflected in the resource that manages the routing policy, and when an event occurs and the routing policy needs to be changed, the administrator should view the event and manually change the routing policy.

DISCLOSURE

Technical Issues

In order to solve the problems of the prior art described above, the present invention is to provide a service mesh traffic management apparatus, system, and method in a distributed Kubernetes multi-cluster environment that collects monitoring metrics, selects a routing policy appropriate for the current mesh situation, and distributes the selected routing policy to each proxy through a custom controller.

Technical Solution

In order to achieve the above object, according to an embodiment of the present invention, a service mesh traffic management apparatus in a distributed Kubernetes multi-cluster environment comprises a processor, and a memory connected to the processor, wherein the memory stores program instructions executable by the processor for performing operations comprising receiving a monitoring metric collected by a Prometheus server distributed in the multi-cluster, selecting a first routing policy based on a predefined routing policy selection rule and the collected monitoring metric, comparing the first routing policy and a second routing policy currently in use, distributing, when the first routing policy and the second routing policy are different, the first routing policy to each proxy in the service mesh.

The service mesh may be configured by using Istio, and an Istio control plane may exist for each cluster in the multi-cluster environment.

The operations may further comprise delivering, when the first routing policy and the second routing policy are different, the first routing policy to a first Istio control plane in its own cluster so that the first routing policy is synchronized with a second Istio control plane within the service mesh and distributed to each proxy within the service mesh.

The service mesh traffic management apparatus can change the value of Virtual Service, which is one of the custom resources managing Istio's routing policy selection rule.

The routing policy may be defined using Virtual Service and Destination Rule, which are Istio's own resources.

A service affected by a routing policy within the service mesh may be previously designated.

The monitoring metric may be collected from a proxy deployed within each cluster.

According to another aspect of the present invention, a service mesh traffic management system in a distributed Kubernetes multi-cluster environment comprises a first cluster including a custom controller, and a plurality of second clusters including a proxy reflecting a routing policy selected by the custom controller, wherein the custom controller receives a monitoring metric collected by a Prometheus server distributed in the second cluster, selects a first routing policy based on a predefined routing policy selection rule and the collected monitoring metric, compares the first routing policy and a second routing policy currently in use, distributes, when the first routing policy and the second routing policy are different, the first routing policy to each proxy of the second cluster.

According to another aspect of the present invention, a method for managing service mesh traffic by a custom controller included in a first cluster in a distributed Kubernetes multi-cluster environment comprises receiving a monitoring metric collected by a Prometheus server distributed in the multi-cluster, selecting a first routing policy based on a predefined routing policy selection rule and the collected monitoring metric, comparing the first routing policy and a second routing policy currently in use; and distributing, when the first routing policy and the second routing policy are different, the first routing policy to each proxy in the service mesh.

According to another aspect of the present invention, a computer program stored in a computer-readable recording medium for performing the above method is provided.

Advantageous Effects

The present invention proposes a structure to guarantee performance other than reliability to support a multi-site service mesh infrastructure, and utilizes Prometheus' monitoring metrics using a custom controller, so it has the advantage that any system that is already using Prometheus can use it by defining a custom controller without any special changes on the system.

In addition, it can complement the shortcomings of the existing service mesh, which requires administrators to manually change routing policies to suit event situation by selecting a routing policy appropriate for the conditions of a specific event situation, collecting monitoring metrics through the Prometheus server, determining the event situation, and dynamically distributing an appropriate routing policy.

DESCRIPTION OF DRAWINGS

These and/or other aspects will become apparent and more readily appreciated from the following description of the embodiments, taken in conjunction with the accompanying drawings in which:

FIG. 3 is a diagram illustrating a TrafficManage YAML file according to this embodiment.

DETAILED DESCRIPTION OF EMBODIMENTS

Figure 1:
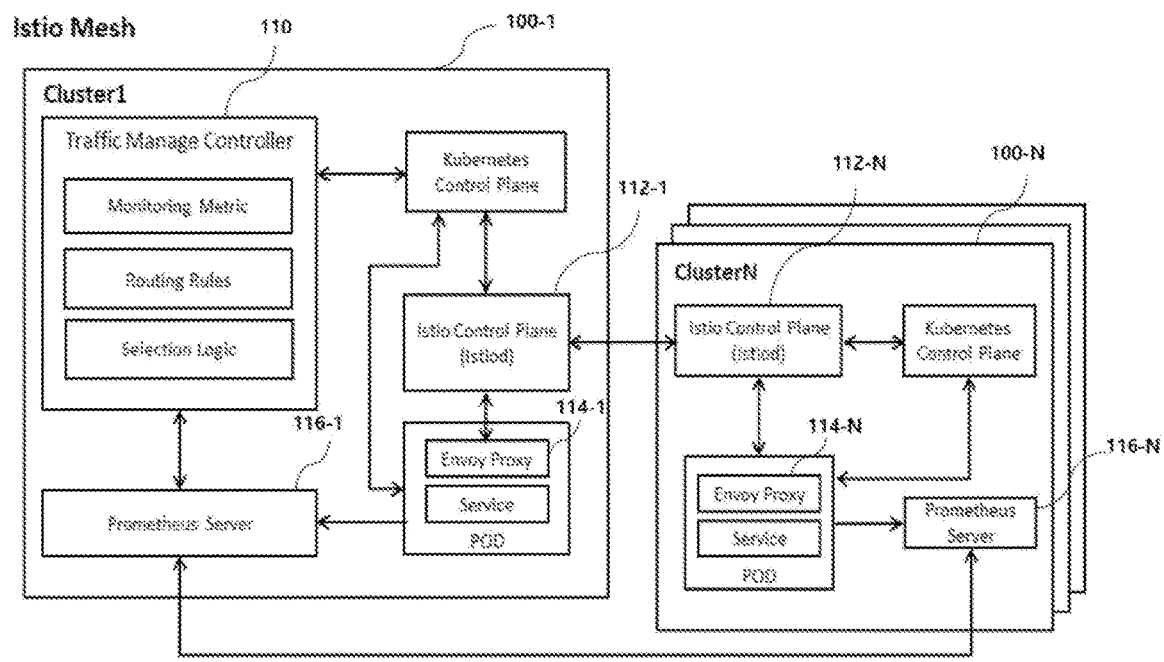
FIG. 1 is a diagram illustrating a traffic management system for a service mesh according to this embodiment.

Since the present invention can make various changes and have various embodiments, specific embodiments will be illustrated in the drawings and described in detail in the detailed description. However, this is not intended to limit the present invention to specific embodiments, and should be understood to include all changes, equivalents, and substitutes included in the spirit and technical scope of the present invention.

The terms used herein are only used to describe specific embodiments and are not intended to limit the invention. Singular expressions include plural expressions unless the context clearly dictates otherwise. In this specification, terms such as "comprise" or "have" are intended to indicate the presence of features, numbers, steps, operations, components, parts, or combinations thereof described in the specification, but are not intended to exclude in advance the possibility of the existence or addition of one or more other features, numbers, steps, operations, components, parts, or combinations thereof.

In addition, the components of the embodiments described with reference to each drawing are not limited to the corresponding embodiments, and may be implemented to be included in other embodiments within the scope of maintaining the technical spirit of the present invention, and a plurality of embodiments may be re-implemented as a single integrated embodiment even if separate descriptions are omitted.

In addition, when describing with reference to the accompanying drawings, identical or related reference numerals will be assigned to identical components regardless of the reference numerals, and overlapping descriptions thereof will be omitted. In describing the present invention, if it is determined that a detailed description of related known technologies may unnecessarily obscure the gist of the present invention, the detailed description will be omitted.

In this embodiment, a structure for a service mesh ensures the various performance requirements of applications in a distributed Kubernetes multi-cluster environment.

In more detail, this embodiment proposes a structure that allows the system to change its routing policy on its own by reflecting monitoring metrics.

FIG. 1 is a diagram illustrating a traffic management system for a service mesh according to this embodiment.

Referring to FIG. 1, it may comprise a first cluster 100-1 and a plurality of second clusters 100-N including proxies by reflecting the routing policy selected by the custom controller 110 and included in the first cluster 100-1.

According to this embodiment, a service mesh is configured by using Istio in a distributed Kubernetes multi-cluster environment, and a multi-control plane structure is designed, in which an Istio control plane 112-N exists for each cluster, to perform synchronization between control planes and manage the proxy (Envoy proxy) 114-N within the mesh.

According to this embodiment, a custom controller 110 that can change the value of Virtual Service, which is one of the custom resources that manages the routing rules of the existing Istio in the service mesh, is defined.

Istio is a service mesh, which is a service networking layer that allows flexible and easy automation of application network functions.

Istio is a widely used solution for managing the various microservices that configure cloud-based applications, and the Istio service mesh supports how microservices communicate with each other and share data.

One of Istio's functions is to manage traffic, such as routing incoming traffic to multiple services or artificially creating traffic failures for testing purposes.

Istio traffic management components are largely defined in three categories: Gateway, Virtual Service, and Destination Rule.

Gateway is the front line that receives traffic from the outside, and defines the host name, port, and protocol to receive traffic.

Virtual Service is a function that routes incoming traffic to a service.

If Virtual Service is routed to send traffic to Kubernetes Service, the next Destination Rule defines how to send traffic to that service. Here, one Destination Rule is defined for only one Service.

In addition, using the Operator Framework open source toolkit, TrafficManage, which is a custom resource that manages the routing policy of the Istio mesh based on monitoring metrics, is defined and the TrafficManage controller that operates together is defined as a custom controller.

The custom controller according to this embodiment collects monitoring metrics from the Prometheus server 116-N distributed in the Kubernetes cluster and selects an appropriate first routing policy according to rules for selecting a routing policy (Routing Rules) defined in TrafficManage based on the collected monitoring metrics.

The routing policy is defined using Istio's own resources, Virtual Service and Destination Rule, and compares the selected routing policy with a second routing policy currently in use. If the second routing policy currently in use and the first routing policy selected by the custom controller 110 are the same, the routing policy currently in use continues to be used, and if they are different, the custom controller 110 transmits the selected routing policy to the first Istio control plane 112-1.

The first Istio control plane 112-1 synchronizes the routing policy received from the custom controller 110 with other Istio control planes 112-N in the service mesh and distributes it to the envoy proxy 114-N in the service mesh.

Figure 2:
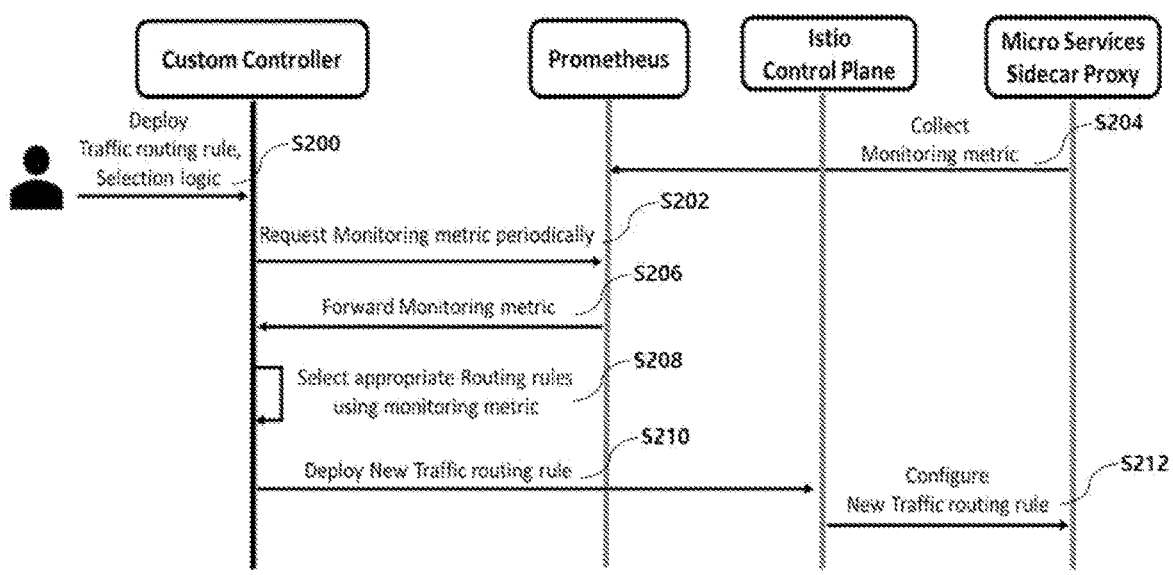
FIG. 2 is a diagram showing a service mesh traffic management operation procedure according to this embodiment.

FIG. 2 is a diagram showing a service mesh traffic management operation procedure according to this embodiment.

Referring to FIG. 2, the custom controller 110 stores routing policy selection rules in advance to dynamically change the routing policy (step 200) and periodically requests monitoring metrics from the Prometheus server 116 (step 202).

The Prometheus server 106-N included in each cluster 100-N collects monitoring metrics from the proxy 114-N (step 204).

The collected monitoring metrics are delivered to the custom controller 110 through the Prometheus server 116-1 of the first cluster 100-1 (step 206).

According to this embodiment, TrafficManage, which is a custom resource, defines routing policy selection rules and routing policies to dynamically change the routing policy based on monitoring metrics, and specifies services affected by the routing policy within the mesh.

The custom controller 110 selects a routing policy based on predefined routing policy selection rules and monitoring metrics (step 208).

As described above, if the first routing policy selected in step 208 is different from the second routing policy currently in use, the newly selected first routing policy is transmitted to the Istio control plane 112-1 (step 210), and through this, the first routing policy is distributed to the proxy 114-N of each cluster 100-N (step 212).

According to this embodiment, in order to prevent network failures or inefficient use of computing resources due to frequent changes in routing policy, a minimum update time is set to prevent a situation in which the routing policy changes multiple times within a short period of time.

FIG. 3 is a diagram illustrating a TrafficManage YAML file according to this embodiment.

The method for managing service mesh traffic according to the present embodiment can also be implemented in the form of a recording medium containing instructions executable by a computer, such as an application or program module executed by a computer. A computer-readable medium can be any available medium that can be accessed by a computer and includes both volatile and non-volatile medium, removable and non-removable medium. Additionally, a computer-readable medium may include a computer storage medium. A computer storage medium includes both volatile and non-volatile, removable and non-removable medium implemented in any method or technology for storage of information such as computer-readable instructions, data structures, program modules, or other data.

The method for managing service mesh traffic described above may be executed by an application installed by default on the terminal (this may include programs included in the platform or operating system installed by default on the terminal), and may also be executed by an application (i.e., program) installed directly on the master terminal by a user through an application providing server such as an application store server, or a web server related to the application or the service. In this sense, the method for managing service mesh traffic described above can be implemented as an application (i.e., program) installed by default in the terminal or directly installed by the user and recorded on a computer-readable recording medium.

The above-described embodiments of the present invention have been disclosed for illustrative purposes, and those skilled in the art will be able to make various modifications, changes, and additions within the spirit and scope of the present invention, and such modifications, changes, and additions should be regarded as falling within the scope of the patent claims below.

The invention claimed is:

1. A service mesh traffic management apparatus in a distributed Kubernetes multi-cluster environment comprising:
   a processor; and
   a memory connected to the processor,
   wherein the memory stores program instructions executable by the processor for performing operations comprising,
   receiving a monitoring metric collected by a Prometheus server distributed in the multi-cluster,
   selecting a first routing policy based on a predefined routing policy selection rule and the collected monitoring metric,
   comparing the first routing policy and a second routing policy currently in use,
   distributing, when the first routing policy and the second routing policy are different, the first routing policy to each proxy in the service mesh.

2. The apparatus of claim 1, wherein the service mesh is configured by using Istio,
   wherein an Istio control plane exists for each cluster in the multi-cluster environment.

3. The apparatus of claim 2, wherein the operations further comprise,
   delivering, when the first routing policy and the second routing policy are different, the first routing policy to a first Istio control plane in its own cluster so that the first routing policy is synchronized with a second Istio control plane within the service mesh and distributed to each proxy within the service mesh.

4. The apparatus of claim 3, wherein the service mesh traffic management apparatus is defined as a custom controller that can change a value of Virtual Service, which is one of custom resources managing Istio's routing policy selection rule.

5. The apparatus of claim 4, wherein the routing policy is defined using Virtual Service and Destination Rule, which are Istio's own resources.

6. The apparatus of claim 1, wherein a service affected by a routing policy within the service mesh is previously designated.

7. The apparatus of claim 1, wherein the monitoring metric is collected from a proxy deployed within each cluster.

8. A service mesh traffic management system in a distributed Kubernetes multi-cluster environment comprising:
 a first cluster including a custom controller; and
 a plurality of second clusters including a proxy reflecting a routing policy selected by the custom controller,
 wherein the custom controller,
 receives a monitoring metric collected by a Prometheus server distributed in the second cluster,
 selects a first routing policy based on a predefined routing policy selection rule and the collected monitoring metric,
 compares the first routing policy and a second routing policy currently in use,
 distributes, when the first routing policy and the second routing policy are different, the first routing policy to each proxy of the second cluster.

9. A method for managing service mesh traffic by a custom controller included in a first cluster in a distributed Kubernetes multi-cluster environment comprising:
 receiving a monitoring metric collected by a Prometheus server distributed in the multi-cluster;
 selecting a first routing policy based on a predefined routing policy selection rule and the collected monitoring metric;
 comparing the first routing policy and a second routing policy currently in use; and
 distributing, when the first routing policy and the second routing policy are different, the first routing policy to each proxy in the service mesh.

10. The method of claim 9, wherein the service mesh is configured by using Istio,
 wherein an Istio control plane exists for each cluster in the multi-cluster environment.

11. The method of claim 10, wherein distributing the first routing policy to each proxy in the service mesh comprises,
 delivering, when the first routing policy and the second routing policy are different, the first routing policy to a first Istio control plane in its own cluster so that the first routing policy is synchronized with a second Istio control plane within the service mesh and distributed to each proxy within the service mesh.

12. The method of claim 11, wherein the custom controller changes a value of Virtual Service, which is one of custom resources that manages Istio's routing policy selection rule.

13. The method of claim 12, wherein the routing policy is defined using Virtual Service and Destination Rule, which are Istio's own resources.

14. The method of claim 9, wherein a service affected by a routing policy within the service mesh is previously designated.

15. A computer program stored in a computer-readable recording medium for performing the method of claim 9.

* * * * *